(12) United States Patent
Wildermuth et al.

(10) Patent No.: US 12,728,411 B2
(45) Date of Patent: Sep. 8, 2026

(54) ION EXCHANGER FILTER DEVICE AND ION EXCHANGER CARTRIDGE

(71) Applicant: MANN+HUMMEL GMBH, Ludwigsburg (DE)

(72) Inventors: Andreas Wildermuth, Marbach (DE); Frank Pflueger, Sachsenheim (DE); Arndt-Udo Rolle, Stuttgart (DE); Simon Leininger, Stuttgart (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 854 days.

(21) Appl. No.: 17/894,450

(22) Filed: Aug. 24, 2022

(65) Prior Publication Data

US 2022/0410138 A1 Dec. 29, 2022

Related U.S. Application Data

(63) Continuation of application No. PCT/EP2021/052844, filed on Feb. 5, 2021.

(30) Foreign Application Priority Data

Feb. 24, 2020 (DE) ......................... 102020104720.7

(51) Int. Cl.
*B01J 47/024* (2017.01)
*H01M 8/04044* (2016.01)
*H01M 8/04029* (2016.01)

(52) U.S. Cl.
CPC ....... *B01J 47/024* (2013.01); *H01M 8/04044* (2013.01); *H01M 8/04029* (2013.01)

(58) Field of Classification Search
CPC ............. B01J 47/024; H01M 8/04029; H01M 8/04044; Y02E 60/50
See application file for complete search history.

(56) References Cited

U.S. PATENT DOCUMENTS

2005/0115884 A1 6/2005 Suzuki et al.
2007/0119770 A1 5/2007 Suzuki et al.
2009/0233134 A1 9/2009 Hobmeyr et al.
2012/0148930 A1 6/2012 Beylich et al.
2013/0309586 A1 11/2013 Mann
2016/0089618 A1 3/2016 Ogura et al.
2016/0164118 A1 6/2016 Nakagaki et al.

FOREIGN PATENT DOCUMENTS

DE 102009037080 A1 2/2011
WO 2013167946 A1 11/2013

*Primary Examiner* — Dirk R Bass

(57) ABSTRACT

An ion exchanger filter device has a housing with inflow opening and outflow opening for a medium that penetrate a wall of the housing. An ion exchanger cartridge is arranged in the housing. A flow path for the medium extends from inflow opening through the ion exchanger cartridge to outflow opening. The ion exchanger cartridge has a cartridge container with a receptacle that is delimited by a circumferentially extending wall provided with one or more outflow ports distributed circumferentially about the circumferentially extending wall. The receptacle is filled with ion exchanger material. The outflow ports, relative to the outflow opening, are arranged offset in axial direction of the ion exchanger filter device. The flow path has a deflection downstream of the outflow ports. The outflow ports, relative to a direction of gravity in intended mounting position of the ion exchanger filter device, are arranged axially above the outflow opening.

13 Claims, 4 Drawing Sheets

ION EXCHANGER FILTER DEVICE AND ION EXCHANGER CARTRIDGE

CROSS-REFERENCE TO RELATED APPLICATIONS

This application is a continuation application of international application No. PCT/EP2021/052844 having an international filing date of 5 Feb. 2021 and designating the United States, the international application claiming a priority date of 24 Feb. 2020 based on prior filed German patent application No. 10 2020 104 720.7, the entire contents of the aforesaid international application and the aforesaid German patent application being incorporated herein by reference.

BACKGROUND OF THE INVENTION

The invention concerns an ion exchanger filter device, in particular for a fuel cell system, with a housing in which an ion exchanger cartridge is received as well as an ion exchanger cartridge for an ion exchanger filter device.

Fuel cells have an electrical efficiency of approximately 50%. The remainder of the energy is obtained as heat. The latter must be discharged in order to keep the efficiency of the fuel cell as high as possible. For this purpose, a cooling medium flows about the cells. In case the cooling medium is electrically conductive, short circuiting between the cells may occur. Therefore, a deionization by means of an ion exchanger is necessary. Since the cooling liquid must fulfill also further properties such as anti-freezing, mixtures are used here, e.g. deionized water and mono-ethylene glycol in a ratio of 50:50.

DE102009012379A1 discloses an ion exchanger cartridge for a cooling agent system of a fuel cell stack with a housing that is adapted so as to contain an ion exchanger resin therein. The housing comprises an inlet and at least one medium-permeable outlet port that is configured for flow of cooling agent therethrough. The ion exchanger cartridge is adapted such that it is arranged removably in the cooling agent system. DE102009012379A1 further discloses for this purpose an ion exchanger cartridge arrangement which comprises the ion exchanger cartridge. The ion exchanger cartridge arrangement comprises a holder that is coupled with the ion exchanger cartridge. The holder is adapted for removal of the ion exchanger cartridge from the cooling agent system.

SUMMARY OF THE INVENTION

An object of the invention is to provide a service-friendly ion exchanger filter device that is advantageous regarding installation space and provided with an improved venting possibility.

A further object is to provide an ion exchanger cartridge for a service-friendly ion exchanger filter device that is advantageous regarding installation space and provided with an improved venting possibility.

The aforementioned object is solved according to an aspect of the invention by an ion exchanger filter device, in particular fora fuel cell system, with a housing in which an ion exchanger cartridge is received, wherein the housing comprises at least one inflow opening and at least one outflow opening for a medium, wherein the at least one inflow opening and the at least one outflow opening penetrate a wall of the housing, wherein a flow path extends from the inflow opening through the ion exchanger cartridge to the outflow opening, wherein the ion exchanger cartridge comprises a cartridge container with a receptacle that is filled with ion exchanger material and is delimited by a circumferentially extending wall that comprises one or a plurality of outflow ports distributed at or about its circumference, characterized in that the outflow port or ports of the ion exchanger cartridge in relation to the outflow opening of the housing are arranged offset in axial direction, wherein the flow path downstream of the outflow ports of the ion exchanger cartridge comprises at least one deflection, in particular by at least 45°, preferably by 90°.

The further object is solved according to a further aspect of the invention by an ion exchanger cartridge for an ion exchanger filter device according to the invention, with a cartridge container that comprises a receptacle that is filled with ion exchanger material and is delimited by a circumferentially extending wall that comprises one or a plurality of outflow ports distributed at or about its circumference, characterized in that the wall is configured connected as one piece or with form fit or material fusion to a cover that, as intended, is provided as cover of a housing of the ion exchanger filter device for receiving the ion exchanger cartridge.

Beneficial configurations and advantages of the invention result from the additional claims, the description, and the drawing.

An ion exchanger filter device is proposed, in particular for a fuel cell system, with a housing in which an ion exchanger cartridge is received, wherein the housing comprises at least one inflow opening and at least one outflow opening for a medium, and wherein the at least one inflow opening and the at least one outflow opening penetrate a wall of the housing. A flow path extends from the inflow opening through the ion exchanger cartridge to the outflow opening. The ion exchanger cartridge comprises a cartridge container with a receptacle that is filled with ion exchanger material and is delimited by a circumferentially extending wall that comprises one or a plurality of outflow ports distributed at or about its circumference.

According to the invention, the outlet port or ports of the ion exchanger cartridge in relation to the outflow opening of the housing are arranged offset in axial direction, wherein the flow path comprises downstream of the outflow ports of the ion exchanger cartridge at least one deflection, in particular by at least 45°, preferably by 90°. The flow exits from the outflow ports substantially in radial direction in order to experience subsequently the deflection.

According to a preferred further embodiment, the outflow opening can penetrate a jacket wall of the housing. In a further embodiment variant, the inflow opening can also penetrate a jacket wall of the housing, wherein the inflow opening alternatively can however be provided also in an end face wall.

Due to the deflection, the flow path downstream of the outflow ports extends in sections opposite to a flow path within the cartridge body.

Beneficially, the ion exchanger filter device can be used for deionizing water, for example, for internal combustion engines with water injection, fuel cell systems, and the like.

An improvement of the manufacturing process of the ion exchanger cartridge can advantageously be obtained by a cartridge container with insert-molded screen fabric, wherein the screen fabric can cover the inflow opening as well as the at least one outflow opening of the ion exchanger cartridge. Advantage of this design is that insert molding is required only for one component. In this context, the inflow opening ideally can extend perpendicularly to the axial direction, for example, in the bottom of the ion exchanger cartridge and the at least one outflow opening can be radially oriented in relation to the axial direction of the ion exchanger cartridge in the wall of the ion exchanger cartridge. The closure of the cartridge container filled with the ion exchanger material, for example, ion exchanger resin, can be realized directly with the cover of the housing of the ion exchanger filter device so that this component group can be reduced by one component.

This cover ensures that the ion exchanger material remains in the ion exchanger cartridge and can seal in operation also the housing against the environment.

For the ion exchanger filter device according to the invention, the installation space can be utilized beneficially because ion exchanger material can be arranged also above the outlet opening of the ion exchanger filter device when the ion exchanger cartridge extends in axial direction past the outflow opening. The cooling medium can then flow to the inner side of the cover where it is deflected and, via an annular gap between cartridge container and cover of the ion exchanger filter device, can be guided opposite to the prior flow direction back to the outflow opening.

In this context, the deflection of the flow upon entry into the annular gap can act in a homogenizing manner on the flow so that the entire ion exchanger material is used up uniformly and no dead spaces are formed with respect to the flow.

An arrangement of the outflow opening far toward the top at the housing of the ion exchanger filter device in relation to the direction of gravity can, in turn, ensure that the ion exchanger filter device can be vented sufficiently well.

Moreover, the ion exchanger filter device according to the invention ensures that all service-relevant parts can be exchanged in one working step. This encompasses in particular ion exchanger material and seals between ion exchanger cartridge and housing of the ion exchanger filter device.

According to a beneficial embodiment of the ion exchanger filter device, the outflow ports of the ion exchanger cartridge in relation to a direction of gravity in an intended mounting position can be arranged axially above the outflow opening of the housing. In this way, the installation space for the ion exchanger filter device according to the invention can be utilized particularly beneficially because ion exchanger material can be arranged also above the outflow opening of the ion exchanger filter device. The cooling medium flows then to the inner side of the cover where it is deflected and, via an annular gap between cartridge container and cover of the ion exchanger filter device, is guided opposite to the prior flow direction back to the outflow opening.

According to a beneficial embodiment of the ion exchanger filter device, the outflow opening can be arranged in an upper third of a housing height of the housing. In this manner, for the arrangement of the outflow port of the ion exchanger cartridge above the outflow opening of the housing, a beneficial flow distribution as well as a beneficial flow resistance of the ion exchanger filter device can be achieved.

According to a beneficial embodiment of the ion exchanger filter device, the outflow ports of the ion exchanger cartridge can be arranged in an axially upper quarter of the receptacle. In this arrangement of the outlet ports, it is possible to utilize the ion exchanger material in the ion exchanger cartridge particularly beneficially prior to it having to be replaced in a servicing process.

According to a beneficial embodiment of the ion exchanger filter device, screen fabric can be arranged in front of the outflow ports of the ion exchanger cartridge. The screen fabric enables a beneficial passage of the medium flow with low flow resistance and retains at the same time the ion exchanger material in the ion exchanger cartridge. The outflow ports of the cartridge container can thus be dimensioned in a beneficial size.

According to a beneficial embodiment of the ion exchanger filter device, the housing can comprise an inflow socket which is arranged preferably in a lower third of a housing height of the housing. The medium flow can thus be beneficially guided at the bottom of the ion exchanger cartridge through an inflow port into the cartridge container. The flow resistance can be kept low due to the low arrangement of the inflow socket.

According to a beneficial embodiment of the ion exchanger filter device, the ion exchanger cartridge can comprise at least one circumferentially extending seal, in particular a circumferentially extending seal that seals substantially in radial direction, which in particular is arranged at an axial end region facing away from the outlet ports. With such a circumferentially extending, radially acting seal, the ion exchanger cartridge can be effectively sealed at the lower end for intended mounting in the housing of the ion exchanger filter device so that a separation between unfiltered and filtered medium is ensured. The seal is preferably held at the cover, in particular in a seal groove adjoining a thread section.

According to a beneficial embodiment of the ion exchanger filter device, the ion exchanger material can be present as loose fill. The loose fill, for example in the form of ion exchanger resin particles, comprises a large surface area so that the effectiveness and effective utilization of the ion exchanger material is realized and a long service life of the ion exchanger cartridge can be achieved.

According to a beneficial embodiment of the ion exchanger filter device, a cover of the housing can be embodied as one piece together with the ion exchanger cartridge or can be connected with form fit or material fusion to the cartridge container. In this manner, the ion exchanger cartridge can be produced in a cost-efficient manner. Also, an effective sealing action of the interior of the ion exchanger filter device against the environment can be realized. In this way, the separation between filtered and unfiltered medium is possible in an effective manner.

According to a beneficial embodiment of the ion exchanger filter device, the cover can comprise an overlap region, in particular a connection section, in particular a thread section, which in axial direction overlaps the outflow ports. The ion exchanger cartridge can be inserted with the overlap region easily into the housing and connected thereto. In particular, the overlap region can have for this purpose a thread section which interacts with a counter thread arranged at the housing of the ion exchanger filter device. Due to the overlap, the outflow port can be arranged at the upper end of the receptacle of the cartridge container so that an effective utilization of the ion exchanger material is provided. The filtered medium can be guided through the outflow port in a gap between overlap region and wall of the cartridge container to the outflow opening of the housing.

According to a further aspect of the invention, an ion exchanger cartridge for an ion exchanger filter device is proposed, with a cartridge container that comprises a receptacle that is filled with ion exchanger material and is delimited by a circumferentially extending wall that comprises one or a plurality of outflow ports distributed at or about its circumference.

According to the invention, the wall is embodied as one piece together with a cover or connected with form fit or with material fusion to the cover, wherein the cover, as intended, is provided as cover of a housing of the ion exchanger filter device for receiving the ion exchanger cartridge.

An improvement of the manufacturing process of the ion exchanger cartridge can advantageously be obtained by a cartridge container with insert-molded screen fabric, wherein the screen fabric covers the inflow opening as well as the at least one outflow opening of the ion exchanger cartridge. Advantage of this design is that only at one component insert molding is required. In this context, the inflow opening is ideally oriented vertically and the at least one outflow opening is radially oriented in relation to an axial direction of the ion exchanger cartridge.

The closure of the cartridge container filled with the ion exchanger material such as, for example, ion exchanger resin, can be realized directly with the cover of the housing of the ion exchanger filter device so that this component group can be reduced by one component.

In this manner, the ion exchanger cartridge can be produced inexpensively. Also, an effective sealing action of the interior of the ion exchanger filter device against the environment can be realized. In this way, the separation between filtered and unfiltered medium is possible in an effective manner.

According to a beneficial embodiment of the ion exchanger cartridge, the cover can comprise an overlap region, in particular a connection section, in particular a thread section, which in axial direction at least overlaps the wall. The ion exchanger cartridge can be inserted with the overlap region easily into the housing and connected thereto. In particular, the overlap region can comprise a thread section which interacts with a counter thread arranged at the housing of the ion exchanger filter device. Due to the overlap, the outflow port can be arranged at the upper end of the receptacle of the cartridge container so that an effective utilization of the ion exchanger material is provided. The filtered medium can be guided through the outlet port in a gap between overlap region and wall of the cartridge container to the outflow opening of the housing.

A gap, in particular an annular gap, is formed between the overlap region and the wall. In the ion exchanger filter device according to the invention, the installation space can be beneficially utilized because ion exchanger material can be arranged also above the outlet opening of the ion exchanger filter device. The cooling medium flows then to the inner side of the cover where it is deflected and guided through the annular gap between cartridge container and cover of the ion exchanger filter device opposite to the prior flow direction back to the outlet opening. The annular gap acts in this context in a homogenizing manner on the flow so that the entire ion exchanger material is used up uniformly and no dead spaces are formed in regard to the flow.

According to a beneficial embodiment of the ion exchanger cartridge, the outflow port or ports can be arranged in a region of the wall overlapped by the overlap region. Due to the overlap, the outflow port can be arranged at the upper end of the receptacle of the cartridge container so that an effective utilization of the ion exchanger material is provided. The filtered medium can be guided through the outflow port in a gap between overlap region and wall of the cartridge container to the outflow opening of the housing.

Furthermore, a flow path of a medium through the ion exchanger cartridge downstream of the outflow ports comprises at least one deflection within the gap. The deflection of the flow upon entry into the annular gap acts in this context in a homogenizing manner on the flow so that the entire ion exchanger material is used up uniformly and no dead spaces are formed in regard to the flow.

According to a further aspect of the invention, a fuel cell system with an ion exchanger filter device according to the invention is proposed. Advantageously, due to the integration of the ion exchanger filter device in the fuel cell system, a compact facility is provided which can be operated cost-efficiently and service-friendly.

BRIEF DESCRIPTION OF THE DRAWINGS

Further advantages result from the following drawing description. Embodiments of the invention are illustrated. The drawings, description, and claims contain numerous features in combination. A person of skill in the art will consider the features expediently also individually and combine them to expedient further combinations.

FIG. 1 shows an ion exchanger filter device according to an embodiment of the invention in isometric view.

DESCRIPTION OF PREFERRED EMBODIMENTS

Figure 2:
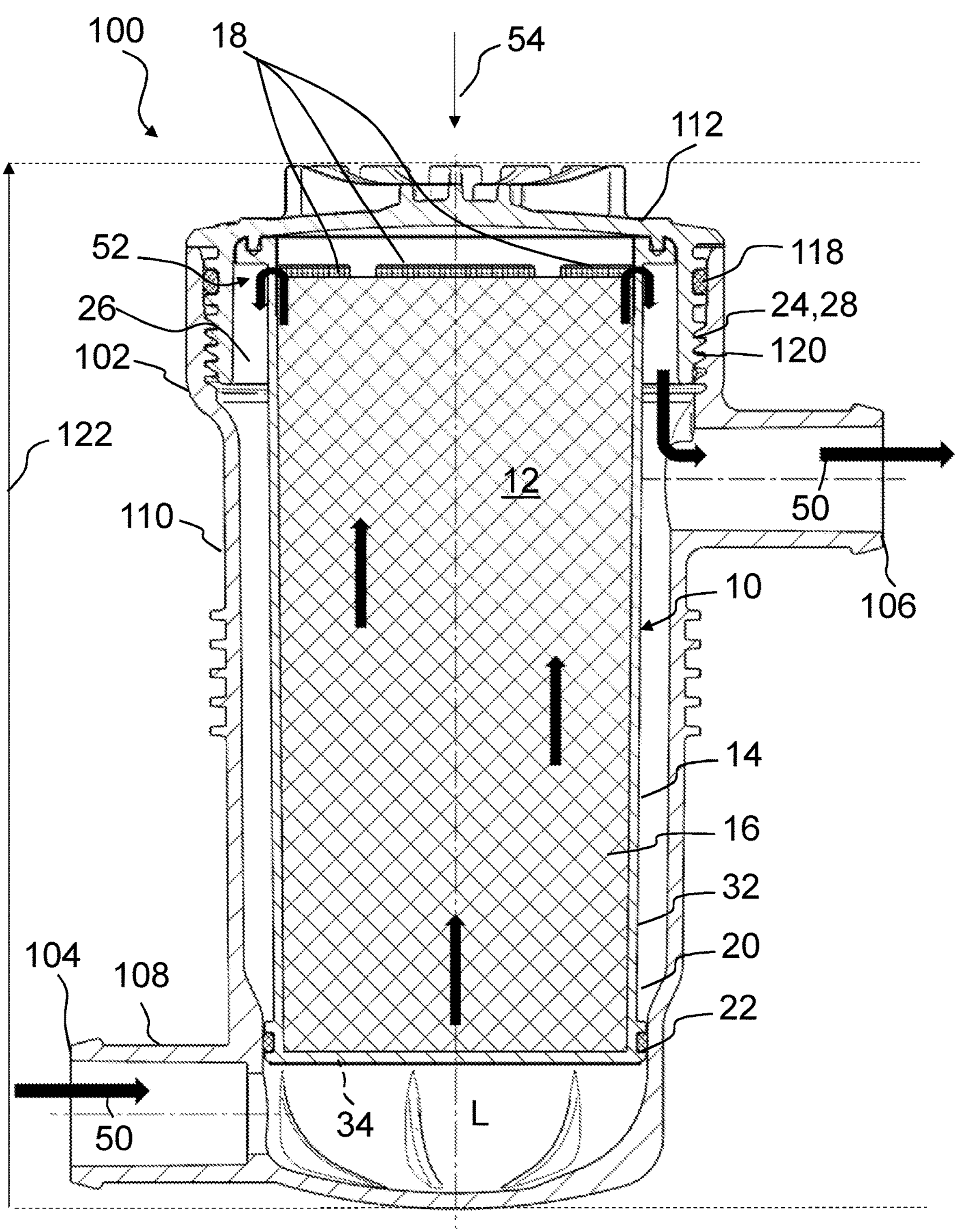
FIG. 2 shows a plan view of the longitudinally sectioned ion exchanger filter device according to FIG. 1.

In the Figures, same or same-type components are identified with same reference characters. The Figures show only examples and are not to be understood as limiting.

Figure 1:
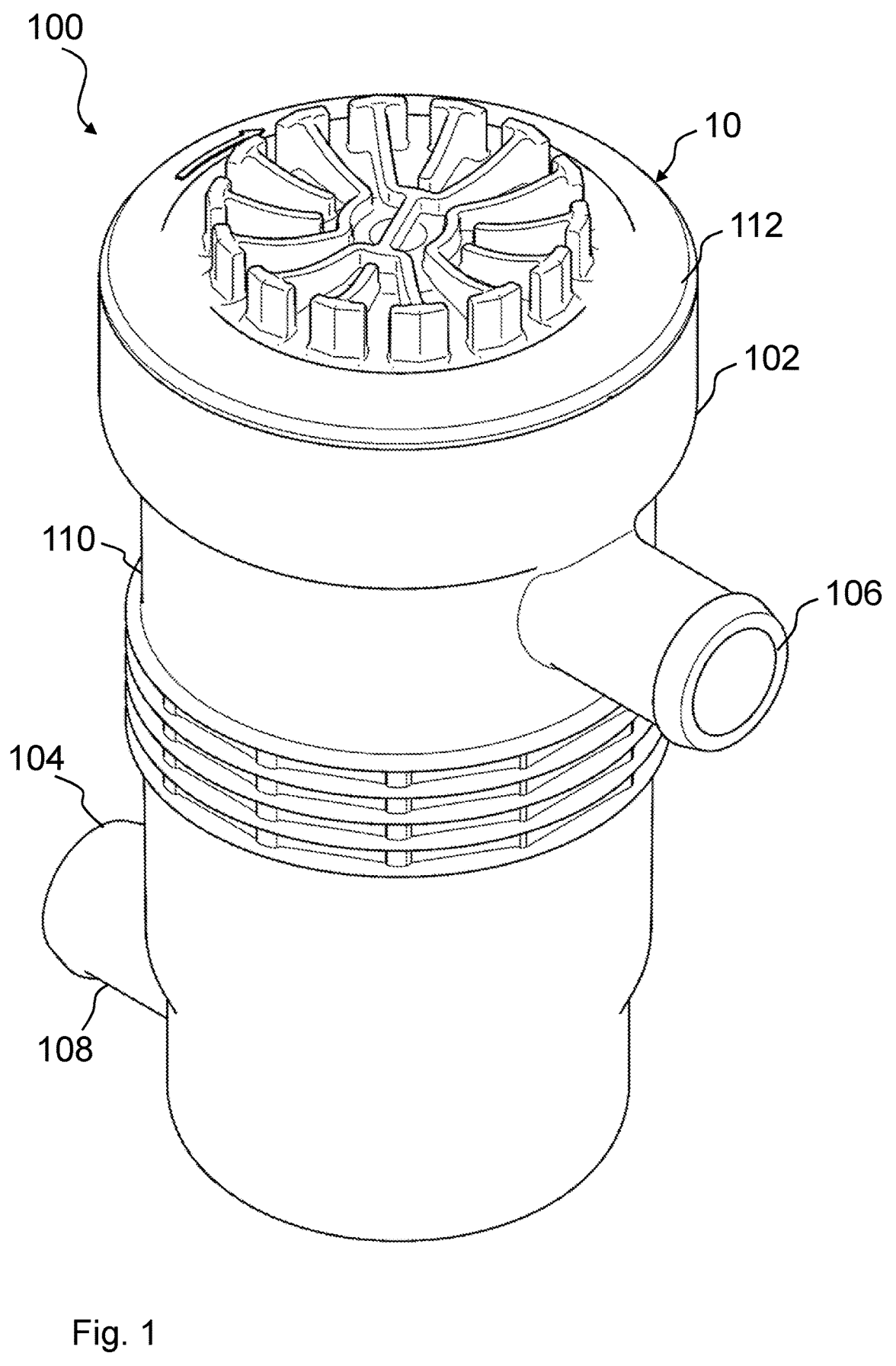

FIGS. 1 and 2 show an ion exchanger filter device 100 according to an embodiment of the invention which is provided in particular for a fuel cell system. The ion exchanger filter device 100 is illustrated in FIG. 1 in isometric view and in FIG. 2 in a longitudinal section.

The ion exchanger filter device 100 comprises a housing 102 in which an ion exchanger cartridge 10 is received. The housing 102 comprises at least one inflow opening 104 and at least one outflow opening 106 for a medium, for example, a cooling medium, wherein the at least one inflow opening 104 and the at least one outflow opening 106 penetrate a jacket wall 110 of the housing 102.

The housing 102 comprises an inflow socket 108 with the inflow opening 104 which is preferably arranged in a lower third of a housing height 122 of the housing 102 wherein the outflow opening 106 is arranged in an upper third of a housing height 122 of the housing 102.

A flow path 50 extends from the inflow opening 104 of the inflow socket 108 through the ion exchanger cartridge 10 to the outflow opening 106.

The ion exchanger cartridge 10 comprises a cartridge container 14 with a receptacle 16 that is filled with ion exchanger material 12 and is delimited by a circumferentially extending wall 32 that comprises a plurality of outflow ports 18 distributed about its circumference. The outflow ports 18 of the ion exchanger cartridge 10 are arranged in relation to the outflow opening 106 of the housing 102 offset in axial direction L. The outflow ports 18 in relation to a direction of gravity 54 in the illustrated intended mounting position are arranged axially above the outlet opening 106 of the housing 102.

The ion exchanger material 12 in the receptacle 16 is provided as loose fill and can contain, for example, an ion exchanger resin in particle form.

Due to the arrangement of the outflow ports 18, the flow path 50 downstream of the outflow ports 18 of the ion exchanger cartridge 10 comprises a deflection 52, in particular about at least 45°.

In the ion exchanger filter device 100 according to the invention, the installation space can be utilized beneficially because ion exchanger resin can be arranged also above the outlet opening 106 of the ion exchanger filter device 100.

The cooling medium flows via the inflow opening 104 of the inflow socket 108 of the housing 102 into the lower interior of the housing 102. Here, the medium can enter the cartridge container 14 via the inflow port 34, not visible in the illustration and arranged in the lower end region 20 of the cartridge container 14, and flow through the ion exchanger material 12. The medium can flow through outflow ports 18 to the inner side of the cover 112 where it is deflected and guided through an annular gap 26 between cartridge container 14 and cover 112 of the ion exchanger filter device 100 opposite to the prior flow direction back to the outflow opening 106.

The deflection 52 of the flow upon entry into the annular gap 26 acts in this context in a homogenizing manner on the flow so that the entire ion exchanger resin is uniformly utilized and no dead spaces are formed in relation to the flow.

The arrangement of the outflow opening 106 far toward the top in relation to the direction of gravity 54 ensures, in turn, that the ion exchanger filter arrangement 100 can be vented sufficiently well.

The ion exchanger cartridge 10 comprises at the lower axial end region 20 facing away from the outlet ports 18 a circumferentially extending seal 22, in particular a circumferentially extending seal that seals substantially in radial direction, which serves for sealing at the inner side of the jacket wall 110 of the housing 102.

The cover 112 of the housing 102 is embodied as one piece together with the ion exchanger cartridge 10 so that the receptacle 16 of the cartridge container 14 is sealed by the cover 112 against the environment. The cover 112 comprises an overlap region 24 which overlaps the outflow ports 18 in axial direction L. The overlap region 24 is configured as a connection section 28 with a thread section.

For intended mounting of the ion exchanger filter device, the ion exchanger cartridge 10 can be inserted with the cover 112 into the housing 102 and connected by the cover 112 to the housing 102. In this context, the thread section of the connection section 28 engages the counter thread 120 of the housing 102. A radially acting, circumferentially extending seal 118 axially above the thread of the connection region 28 is provided for sealing between cover 112 and housing 102.

Figure 3:
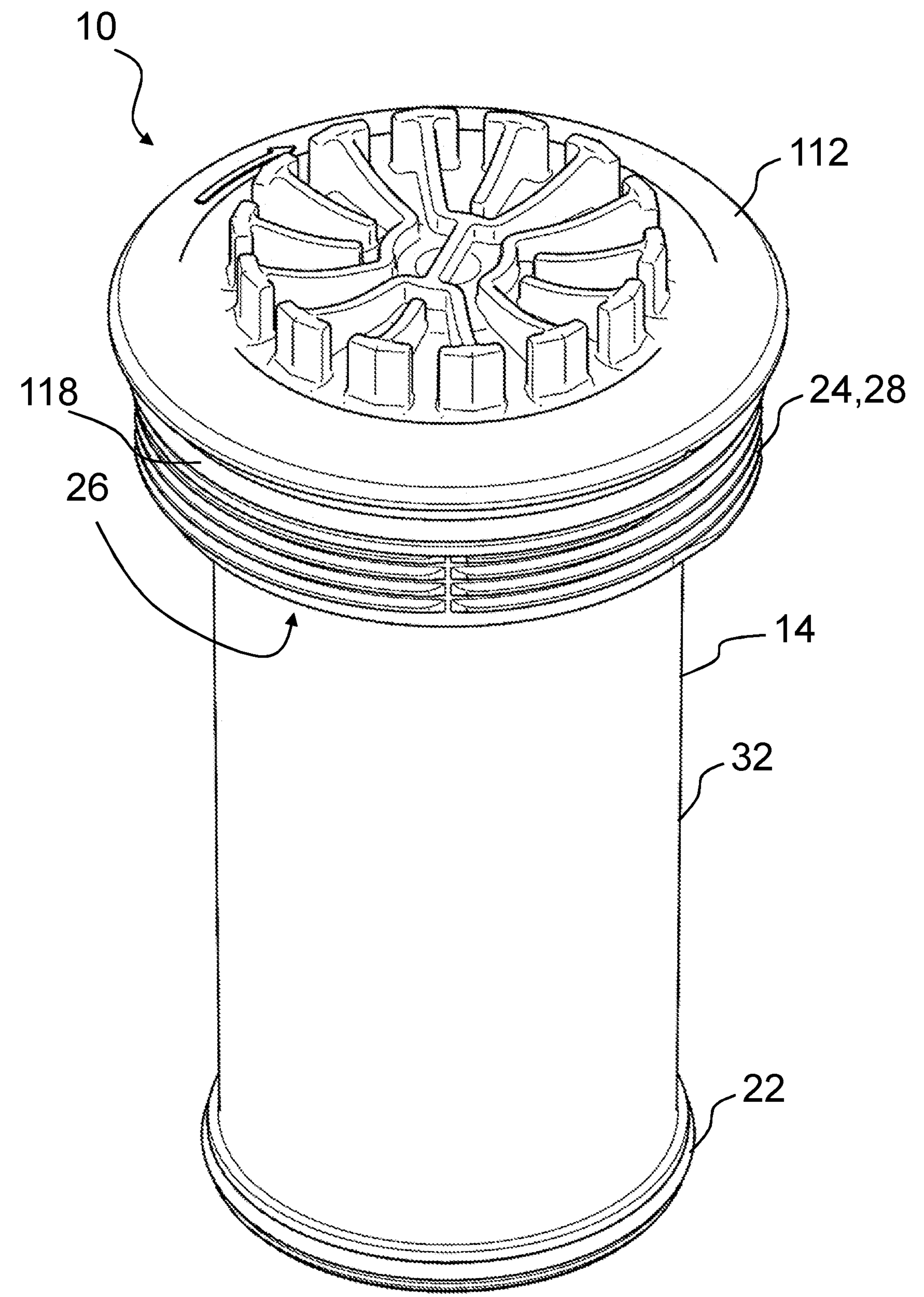
FIG. 3 shows an ion exchanger cartridge for an ion exchanger filter device according to an embodiment of the invention.
Figure 4:
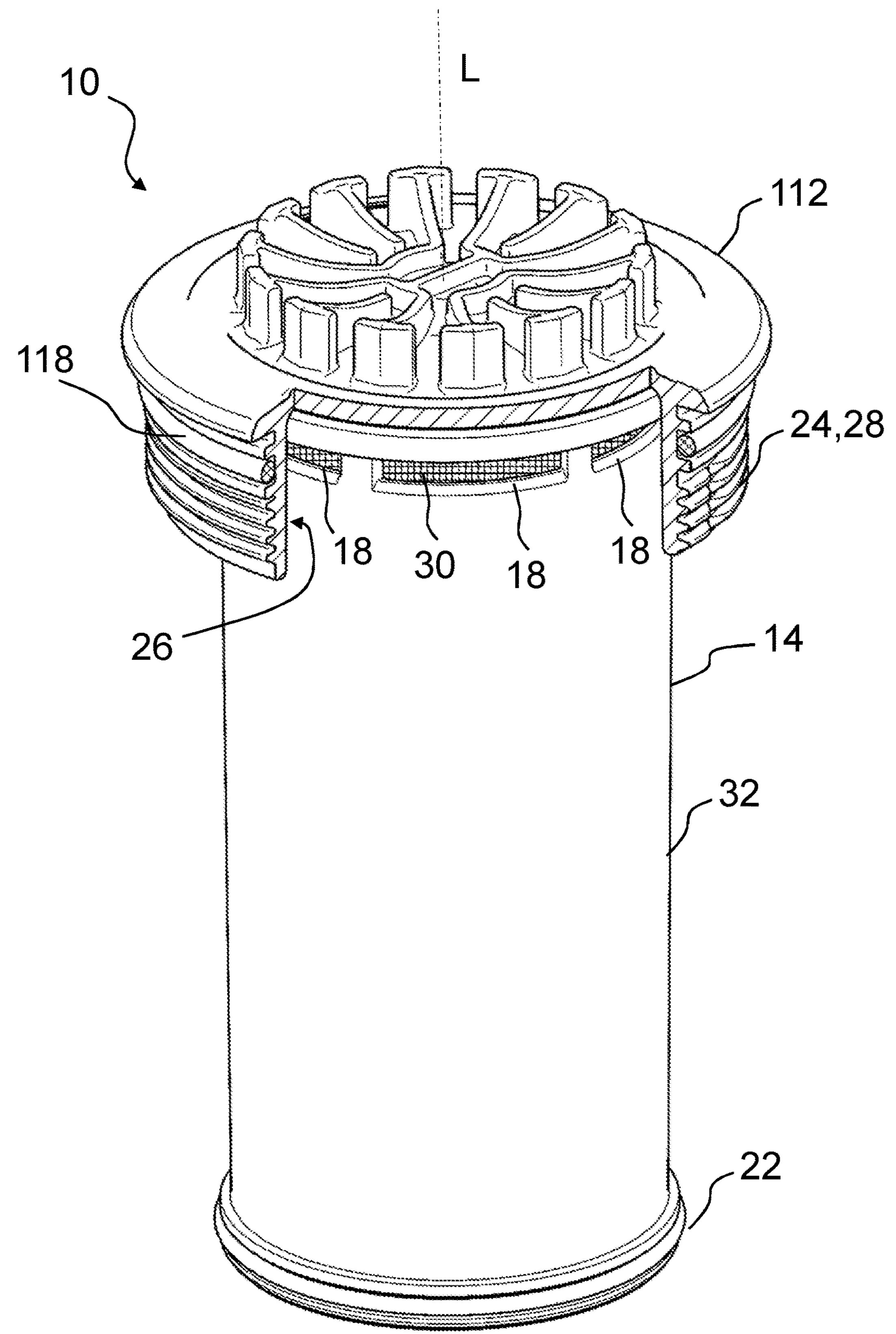
FIG. 4 shows the ion exchanger cartridge according to FIG. 3 with partially sectioned overlap region.

FIG. 3 shows an ion exchanger cartridge 10 for an ion exchanger filter device 100 according to an embodiment of the invention. In FIG. 4, the ion exchanger cartridge 10 according to FIG. 3 is illustrated with partially sectioned overlap region 24 so that the outflow ports 18 can be seen.

The ion exchanger cartridge 10 comprises a cartridge container 14 with a receptacle 16, visible in the longitudinal section in FIG. 2, that is filled with ion exchanger material 12 and is delimited by a circumferentially extending wall 32. The wall 32 comprises a plurality of outflow ports 18 distributed about its circumference.

The wall 32 is embodied as one piece together with the cover 112 that, as intended, is provided as cover 112 of the housing 102 of the ion exchanger filter device 100 illustrated in FIGS. 1 and 2 for receiving the ion exchanger cartridge 10.

As can be seen in particular in FIG. 4, the outflow ports 18 of the ion exchanger cartridge 10 are arranged in an axially upper quarter of the receptacle 16. Furthermore, screen fabric 30 is arranged in the receptacle 16 in front of the outflow ports 18 of the ion exchanger cartridge 10 in order to enable the flow of the medium to exit from the cartridge container 14 and to retain the loose fill of the ion exchanger material 12 at the same time.

The cover 112 comprises an overlap region 24, in particular a connection section 28 with a thread section for connection to the housing 102 of the ion exchanger filter device 100 which in axial direction L at least overlaps the wall 32.

Since the overlap region 24 is arranged at a distance to the wall 32 of the cartridge container 14, between the overlap region 24 and the wall 32 a gap 26, in particular an annular gap, is formed. The outflow ports 18 are arranged in the region of the wall 32 that is overlapped by the overlap 24, i.e., in the region of the gap 26. In this way, a flow path 50 of a medium through the ion exchanger cartridge 10 downstream of the outflow ports 18 comprises a deflection 52 within the gap 26. The deflection 52 of the flow upon entry in the annular gap 26 acts in this context in a homogenizing manner on the flow so that the entire ion exchanger resin is used up uniformly and no dead spaces are formed in relation to the flow.

What is claimed is:

1. An ion exchanger filter device comprising:

a housing comprising at an inflow opening and an outflow opening for a medium, wherein the inflow opening and the outflow opening penetrate a wall of the housing;

an ion exchanger cartridge arranged in the housing, wherein a flow path for the medium extends from the inflow opening through the ion exchanger cartridge in a first flow direction, and to the outflow opening in a second flow direction opposite the first flow direction, and then through the outflow opening in a radial direction relative to an axial direction of the ion exchanger cartridge;

wherein the ion exchanger cartridge comprises a cartridge container comprising a receptacle, wherein the receptacle is delimited by a circumferentially extending wall comprising one or more outflow ports distributed at or about a circumference of the circumferentially extending wall, and wherein a cover of the ion exchanger cartridge for the housing is embodied as one piece with the circumferentially extending wall;

wherein the receptacle is filled with an ion exchanger material;

wherein the one or more outflow ports, in relation to the outflow opening, are arranged offset in the axial direction;

wherein the flow path comprises a deflection of the f w path adjacent the one or more outflow ports from the first flow direction to the second flow direction;

wherein the one or more outflow ports, in an intended mounting position of the ion exchanger filter device, are arranged in the axial direction above the outflow opening; and wherein the cover comprises an overlap region which axially overlaps the circumferentially extending wall in the second direction at a radially outer distance from the circumferentially extending wall to form an annular gap with the one or more outflow ports arranged within the annular gap such that the medium flows from the first flow direction through the one or more outflow ports to an inner side of the cover where the medium is deflected and guided along the annular gap in the second flow direction to the outflow opening.

2. The ion exchanger filter device according to claim 1, wherein the wall of the housing that is penetrated by the outflow opening is a jacket wall of the housing.

3. The ion exchanger filter device according to claim 1, wherein the outflow opening is arranged in an upper third of a housing height of the housing.

4. The ion exchanger filter device according to claim 1, wherein the one or more outflow ports are arranged in the axial direction in an upper quarter of the receptacle.

5. The ion exchanger filter device according to claim 1, wherein the one or more outflow ports are covered by a screen fabric.

6. The ion exchanger filter device according to claim 1, wherein the housing comprises an inflow socket arranged in a lower third of a housing height of the housing.

7. The ion exchanger filter device according to claim 1, wherein the ion exchanger cartridge comprises at least one circumferentially extending seal.

8. The ion exchanger filter device according to claim 7, wherein the at least one circumferentially extending seal is a seal that seals in the radial direction and is arranged at an axial end region of the ion exchanger cartridge facing away from the one or more outflow ports.

9. The ion exchanger filter device according to claim 1, wherein the ion exchanger material is a loose fill.

10. The ion exchanger filter device according to claim 1, wherein the overlap region of the cover is formed as a connection section configured to connect the ion exchanger cartridge to the housing.

11. The ion exchanger filter device according to claim 10, wherein the overlap region of the cover overlaps the one or more outflow ports in the axial direction and forms the annular gap.

12. The ion exchanger filter device according to claim 10, wherein the connection section is a thread section.

13. A fuel cell system comprising an ion exchanger filter device according to claim 1.

* * * * *